(12) United States Patent
Reed (10) Patent No.: US 12,369,574 B2
(45) Date of Patent: *Jul. 29, 2025

(54) FLOATS ATTACHABLE TO FISHING LURE

(71) Applicant: Douglas M. Reed, Bridgeton, NJ (US)

(72) Inventor: Douglas M. Reed, Bridgeton, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 18/207,506

(22) Filed: Jun. 8, 2023

(65) Prior Publication Data

US 2023/0309529 A1    Oct. 5, 2023

Related U.S. Application Data (63) Continuation of application No. 17/214,666, filed on Mar. 26, 2021, now Pat. No. 11,672,240.

(51) Int. Cl.
*A01K 93/00* (2006.01)
*A01K 85/10* (2006.01)

(52) U.S. Cl.
CPC .............. *A01K 93/00* (2013.01); *A01K 85/10* (2013.01)

(58) Field of Classification Search
CPC ........ A01K 93/00; A01K 85/00; A01K 85/02; A01K 85/021; A01K 85/029; A01K 85/1811; A01K 85/1831; A01K 85/1833; A01K 85/1837; A01K 85/1841; A01K 85/1847; A01K 85/1851; A01K 83/06; A01K 83/064
USPC ... 43/43.1, 42.09, 42.1, 42.22, 42.24, 42.35, 43/42.36, 42.37, 42.38, 42.39, 42.41, 43/44.2, 44.8
See application file for complete search history.

(56) References Cited

U.S. PATENT DOCUMENTS

| | | | |
|---|---|---|---|
| 1,980,302 A | 11/1934 | Taylor | |
| 2,439,123 A | 4/1948 | Bell | |
| 2,554,318 A | 5/1951 | Wardrip | |
| 2,560,129 A | 7/1951 | Rhotehamel | |
| 2,640,292 A | 6/1953 | Nadolny | |
| D191,166 S | 8/1961 | William | |
| 3,172,227 A * | 3/1965 | Mackey | A01K 85/18 43/42.31 |
| 3,330,012 A | 7/1967 | Hart | |
| 3,359,674 A | 12/1967 | Strumor | |
| 3,397,479 A | 8/1968 | Tyjewski | |
| 3,526,988 A | 9/1970 | Young | |
| 4,791,749 A | 12/1988 | Stazo | |
| 4,941,280 A | 7/1990 | Rinaldi | |
| 5,096,149 A | 3/1992 | Riese | |
| 5,220,743 A | 6/1993 | Mcclellan | |

(Continued)

OTHER PUBLICATIONS

Ultimate Bass Everything Bass Fishing, Hobbyists inject air to make worms float: www.ultimatebass.com/bass-fishing-forum/index.php?topic=89615.0>, retrieved Mar. 29, 2021.

(Continued)

*Primary Examiner* — Timothy D Collins
*Assistant Examiner* — Maria E Graber
(74) *Attorney, Agent, or Firm* — Patterson + Sheridan, LLP (57) ABSTRACT

Fishing lures, and more particularly, attachable floats for artificial fishing lures that include a buoyant body having a first end, a second end opposite the first end, and an outer wall connecting the first and second ends. The float includes a keeper extending from the body. The keeper is configured to attach the body to a polymeric artificial lure.

14 Claims, 5 Drawing Sheets

(56) References Cited

U.S. PATENT DOCUMENTS

| | | | |
|---|---|---|---|
| 5,992,083 | A | 11/1999 | Deng et al. |
| 6,094,853 | A | 8/2000 | Lim |
| 6,836,997 | B2 | 1/2005 | Cramsey |
| 7,735,257 | B1 | 6/2010 | Firmin |
| 7,841,127 | B1 | 11/2010 | Nakamichi |
| 10,028,493 | B2 | 7/2018 | Mancini |
| 10,064,399 | B2 | 9/2018 | Steer |
| D852,885 | S | 7/2019 | Wang |
| 10,492,478 | B1 | 12/2019 | Parks |
| 11,484,017 | B2 * | 11/2022 | Hajjar .................... A01K 85/01 |
| 2003/0192227 | A1 | 10/2003 | Stava et al. |
| 2003/0233783 | A1 | 12/2003 | Storelli |
| 2004/0216360 | A1 | 11/2004 | Holtzhampf |
| 2005/0120613 | A1 * | 6/2005 | Pack ....................... A01K 85/00 43/44.9 |
| 2007/0193106 | A1 | 8/2007 | Gregory |
| 2008/0168700 | A1 | 7/2008 | Kim |
| 2009/0255169 | A1 | 10/2009 | Lowitzki et al. |
| 2012/0000111 | A1 | 1/2012 | Griffin |
| 2012/0023804 | A1 | 2/2012 | Hogan |
| 2014/0059916 | A1 | 3/2014 | Culver et al. |
| 2017/0231207 | A1 | 8/2017 | Tarazona Sicilia et al. |
| 2018/0027786 | A1 | 2/2018 | Baggett |

OTHER PUBLICATIONS

You Tube: How to Tie the Floating Bead Tail Jig (Crappie and Trout Lure): www.youtube.com/watch?v=SJPHnbUZWeo> Jan. 16, 2019.
Bass Pro Shops, Swimbait hook (not floating): www.basspro.com/shop/en/bass-pro-shops-xps-swim-bait-hooks> Web ID 10205303, retrieved on Mar. 29, 2021.
Tackle Warehouse, Z-Man Texas Eye Jig Head—Swivel jig head (not floating): www.tacklewarehouse.com/Z-Man_Texas_Eye_Jig_Head_3pk/descpage-ZMTEJ.html> Retrieved Mar. 29, 2021.
Jann's Netcraft, Maumee Ohio, Floating jig head: www.jannsnetcraft.com/floating-jigs-rigs/ retreived Mar. 29, 2021.
Tackle Warehouse: GrandeBass Airtail Wiffler Worms 6.5 www.tacklewarehouse.com/GrandeBass_Airtail_Wiggler_Worms_65/descpage-GRANAI.html> , Retrieved Mar. 29, 2021.
VMC Half Moon Wacky Weight (Amazon) (https://www.amazon.comNMC-H <http://www.amazon.comNMC-H/>MWW18-NAT-Wacky-Fishing-Equipment/dp/BO 1N68 EMJO/ref=sr_1_4?content-id=amzn1 .sym.b40947a2-6ca4-4bcd-871b-14689e937 daf&keywords=neko+rig+weight&pd_rd_r=ba466f13-61 b4-44f2-a883-ceb6e764c51e&pd_rd_w=kN LSQ&pd_rd_wg=1 bU D7&pf_rd_p=b (Year: 2016).
Boundary Waters Quetico Forum (https://bwca.com/index.cfm?fuseaction=forum.thread&threadId=1117561&forumID=14&confID=1) (Year: 2018).
Neko Rig Basics Article Major League Fishing (https://majorleaguefishing.com/archives/2017-12-06-neko-rig-basics/) (Year: 2017).
Sailrite Upholstery Twist Pins; Brand Oritz (https://www.sailrite.com/Twist-Pins-Clear-Pack-of-30 <http://www.sailrite.com/Twist-Pins-Clear-Pack-of-30)>) (Year: 2020).
Amazon Wine Bottle Opener: Red Push Pin Waiter's Corkscrew; Brand Bartender Works, Inc (https://www.amazon.com/ <http://www.amazon.com/> Wine-Bottle-Opener-Waiters-Corkscrew/dp/B00SLPHNGK) (Year: 2015).
Shark Tank Products Shotgun Shell Fishing Bobbers (Apr. 13, 2013) (https://allsharktankproducts.com/shark-tank-products-sports/ shell-bobbers-shotgun-shell-fishing-bobbers/) (Year: 2013).
Addicted Fishing How to Float Fishing Setup For Steelhead, Trout, & More YouTube Video (https://www.youtube.com/watch?v= <http://www.youtube.com/watch?v> aGdrY48SaEA) (Year: 2018).
Wacky Bobbers (https://wackybobbers.weebly.com/) (Year: 2020).

* cited by examiner

FLOATS ATTACHABLE TO FISHING LURE

CROSS-REFERENCE TO RELATED APPLICATIONS

This application is a continuation of U.S. patent application Ser. No. 17/214,666 filed Mar. 26, 2021 which is incorporated by reference in its entirety.

BACKGROUND

Field

Embodiments of the present disclosure generally relate to fishing lures, and more particularly, to attachable floats for artificial fishing lures

Description of the Related Art

Figure 1A:
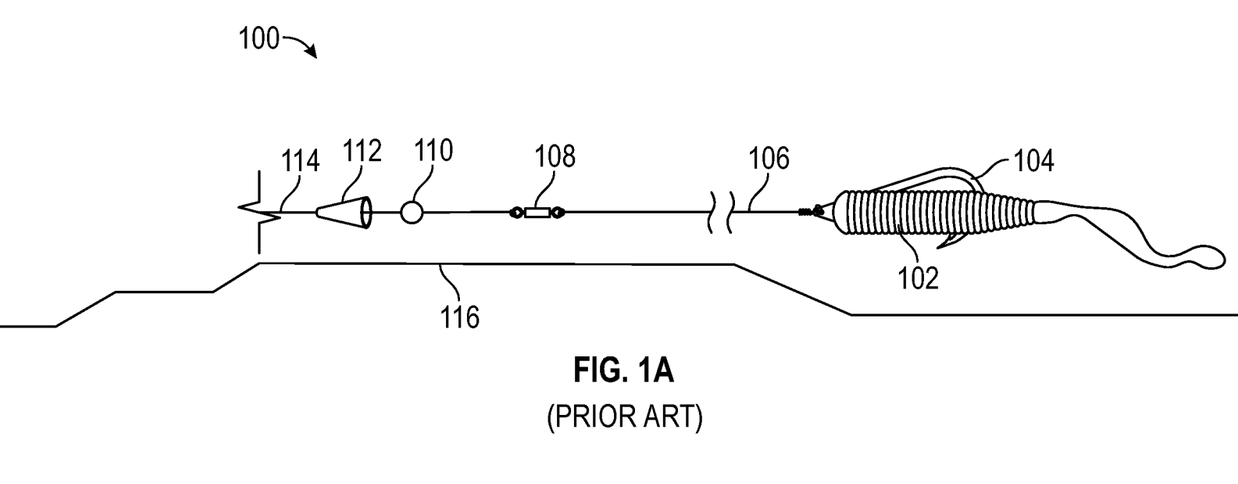
FIG. 1A is a schematic side view of a conventional Carolina rig.
Figure 1B:
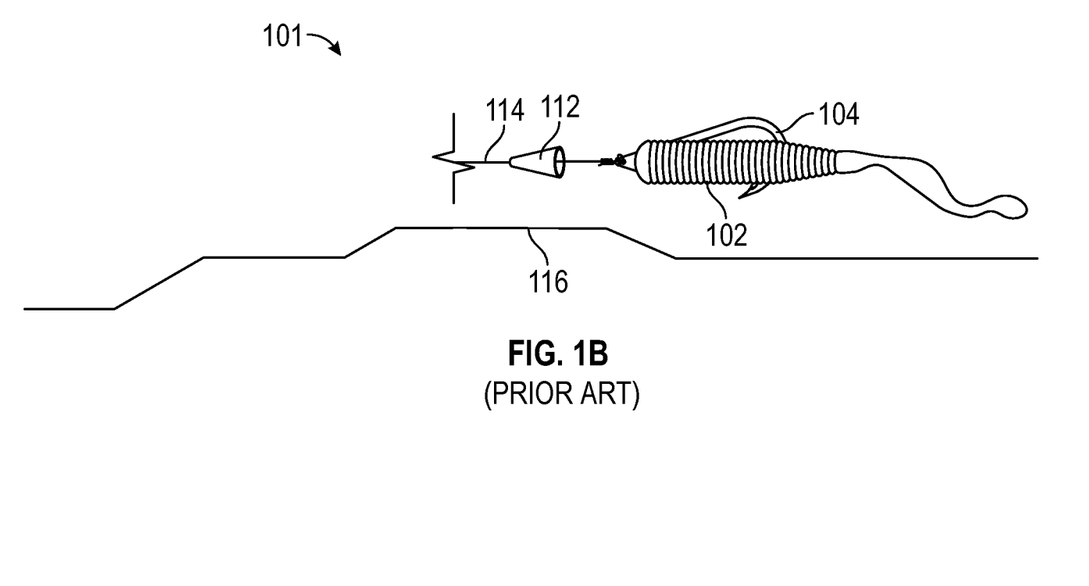
FIG. 1B is a schematic side view of a conventional Texas rig.

Artificial fishing lures may be presented in many different ways, often depending on the target species, water temperature, and structure to which the fish are holding. A Carolina rig (shown in FIG. 1A) and Texas rig (shown in FIG. 1B) are two rigs commonly utilized to both salt and freshwater fish, and particularly largemouth bass. In this example, the Carolina rig 100 is setup with an artificial lure 102, such as a plastic worm, on a hook 104. The artificial lure 102 is generally used "as-molded", i.e., in an as purchased condition. A leader 106 is used to couple and space the hook 104 relative to swivel 108. The leader 106 may be about 12 inches to about 24 inches in length. Above the swivel 108, plastic bead 110 and sinker, or weight, 112 are secured to fishing line 114. On the Carolina rig 100, the sinker 112 is located a fixed distance above the hook 104 where the distance is defined by a length of the leader 106. Carolina rigs are more effective in open water conditions along deep structure where the fish are holding tight to the bottom. In contrast, on the Texas rig 101, the sinker 112 is located directly above the hook 104 and artificial lure 102, as shown in FIG. 1B. Texas rigs used with a soft plastic lure are more effective in shallow water conditions where vegetation, flooded bushes and other types of cover are prominent.

In addition to choice of fishing rig, choice of artificial lure and bait presentation are important to catching fish. However, bait presentation is oftentimes at least partially predetermined based on the angler's choice of fishing rig and type of artificial lure, as well as some other limited technical options, such as hook placement, among others. Additionally, most conventional artificial lures fished either on a Texas rig or a Carolina rig often have a horizontal orientation within the water column, making the lure difficult to see particularly when fished close to the bottom or other horizontal structure.

Therefore, a need exists for an apparatus which is attachable to an artificial fishing lure that provides more control over bait presentation in the water.

SUMMARY

Embodiments of the present disclosure generally relate to fishing lures, and more particularly, to attachable floats for artificial fishing lures.

In one embodiment, a float attachable to an artificial lure comprises a buoyant body and a keeper extending from the body. The body includes a first end, a second end opposite the first end, and an outer wall connecting the first and second ends. The keeper is configured to attach the body to a polymeric artificial lure.

In another embodiment, a float configured to be coupled to an artificial lure is provided. The float includes a buoyant body enclosing a hollow cavity and a keeper extending from the body, wherein the keeper comprises a screw.

In yet another embodiment, a bait assembly includes an artificial lure comprising a body and a float replaceably coupled to the artificial lure. The float comprises a buoyant body and a keeper extending from the body. The body includes a first end, a second end opposite the first end, and an outer wall connecting the first and second ends. The keeper is configured to attach the body to a polymeric artificial lure.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized in other embodiments without specific recitation.

DETAILED DESCRIPTION

Embodiments of the present disclosure generally relate to fishing lures, and more particularly, to attachable floats for artificial fishing lures. Embodiments disclosed herein provide more control over bait presentation in the water. For example, embodiments can alter an orientation and/or depth of the bait when presented in the water column. Furthermore, embodiments disclosed herein are attachable to artificial fishing lures to alter existing lures. Furthermore, embodiments disclosed are removably attachable to artificial fishing lures so that different floats may be used with the same lure.

Figure 2A:
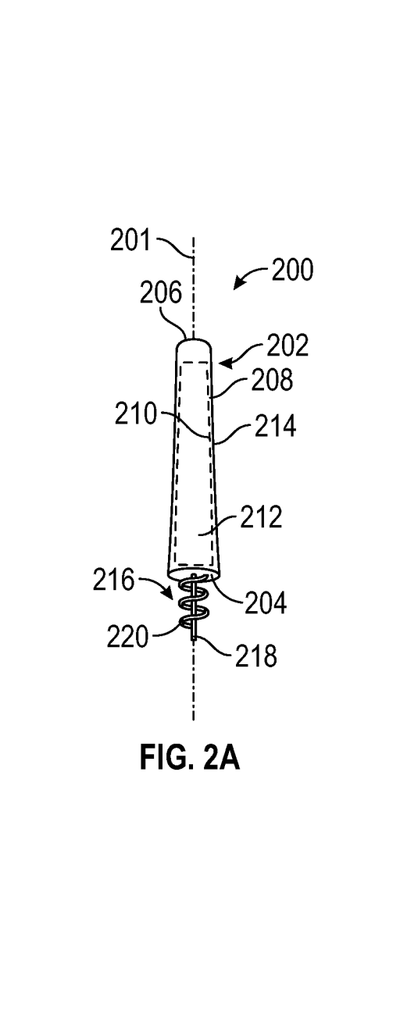
FIG. 2A is a side view of an exemplary attachable float according to one or more embodiments.

FIG. 2A is a side view of an exemplary attachable float 200 according to one or more embodiments. The float 200 generally comprises an elongated body 202 having a proximal end 204 and a distal end 206 opposite the proximal end 204. The proximal end 204 and distal end 206 are connected together by outer wall 208. In this example, the body 202 has a conical shape which tapers radially inwardly towards the distal end 206. In other words, an outer diameter of the outer wall 208 decreases in a distal direction in relation to the body 202. In some other examples (not shown), the outer diameter may be constant along a length of the outer wall 208 or may increase in the distal direction. The sectional profile of the body 202 may be symmetrical or asymmetrical. For example, the sectional profile of the body 202 may be circular, oval, triangular or have another profile. The sectional profile of the body 202 may be selected to match the sectional profile of a particular type of artificial lure for which the float 200 was designed. The sectional profile of the body 202 may also be uniform or non-uniform between the ends 204, 206 of the body 202.

The body 202 is formed from a buoyant (in water) material, such as wood, polymer, polymeric foam or other buoyant material. Alternatively, the body 202 may be formed from a non-buoyant material, with the body 202 nonetheless being buoyant, for example, by having a hollow cavity or other buoyancy generating physical feature. In one example, the body 202 is formed from a hardened polymeric material, such as polycarbonate, polypropylene, or any other suitable plastic or polymer material. The hardened polymeric material may be buoyant in and of itself, or the body 202 formed from the hardened polymeric material has a buoyant geometry. Alternatively, the body 202 may be formed from one or more soft plastic materials. The soft plastic material may be buoyant in and of itself, or the body 202 formed from the soft plastic material has a buoyant geometry. A process for forming the body 202 may include molding (e.g., injection molding), additive manufacturing, or any other suitable fabrication process. In this example, the proximal end 204 and distal end 206 of the body 202 are substantially parallel and oriented substantially orthogonally to a longitudinal axis 201 of the body 202. In some other examples (not shown), the proximal end 204 and distal end 206 may be concave, convex, angled, or have any other suitable shape or orientation.

The outer wall 208 has an inner radial surface 210 (shown in phantom) radially outwardly surrounding and enclosing a hollow cavity 212. In one example, the hollow cavity 212 may be filled with air or another fluid having a density less than the material of the body 202 to increase a buoyancy of the float 200 and/or to alter a center of buoyancy of an artificial fishing lure when attached to the float 200. In some examples, the hollow cavity 212 may be filled with a fluid having a density less than the density of water. In some examples, the float 200 may have neutral buoyancy in relation to water. In some examples (not shown), the float 200 may have different sizes and/or buoyancies to conform to different fishing rigs.

In this example, an outer radial surface 214 of the outer wall 208 is substantially circular in cross-section. In some other examples (not shown), the outer surface 214 may be oval or any other shape in cross-section suitable for artificial fishing lures. In this example, the outer surface 214 is substantially smooth. In some other examples (not shown), the outer surface 214 may have circumferential ridges or any other texture, profile or finish suitable for artificial fishing lures.

A keeper 216 is disposed at the proximal end 204. The keeper 216 functions to attach the body 202 of the float 200 to an artificial lure. The keeper 216 may be a barb, wire, wire hook, screw form or other mechanical mechanism suitable for physically retaining the body 202 of the float 200 to an artificial lure. The keeper 216 extends longitudinally outwardly from the proximal end 204 such that the float 200 is attachable to and detachable from an artificial fishing lure as described in more detail below.

In the example depicted in FIG. 2A, the keeper 216 is substantially aligned with the longitudinal axis 201 of the body 202. The keeper 216 comprises a screw 220. The screw 220 may be a helical screw, corkscrew or other suitable screw form. The screw 220, in the form of a corkscrew, may be disposed radially outward and circumscribe a pilot pin 218. The pin 218 extends axially through the screw 220. The pin 218 and the screw 220 are coupled to and/or disposed in the proximal end 204 of the body 202. For example, the pin 218 and the screw 220 may be insert molded with, or be molded as part of, the body 202 The pin 218 extends beyond a terminal end of the screw 220 in the proximal direction so that during attachment to an artificial fishing lure, a terminal end of the pin 218 contacts the artificial fishing lure before the screw 220. An advantage of the keeper 216 is that the float 200 can be detached from the artificial fishing lure without causing damage to the artificial fishing lure so that the artificial fishing lure can be reused. In one example, the keeper 216 can be reattached to the same artificial fishing lure.

Figure 2B:
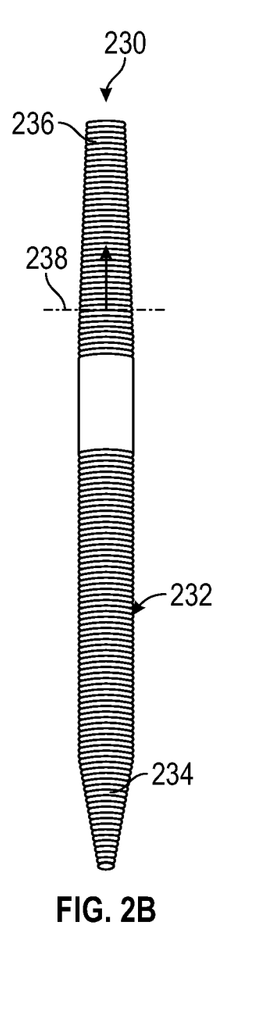
FIGS. 2B-2C illustrate removing a portion of a plastic worm and attaching the float of FIG. 2A, respectively.

FIG. 2B is a side view of an exemplary artificial fishing lure 230. The artificial fishing lure 230 illustrated in FIG. 2B is in the form of, but not limited to, a plastic worm. In some examples, the artificial fishing lure 230 is the same as the plastic worm 102 (shown in FIGS. 1A and 1B). The artificial fishing lure 230 as molded generally comprises an elongated body 232 having a proximal end 234 (i.e., head end) and a distal end 236 (i.e., tail end). The body 232 may be formed from a soft plastic material, such as a polyvinylchloride suspension (e.g., Plastisol), or any other suitable plastic or polymer material comprised in plastic or polymer baits. The float 200 may be attached directly to the as molded artificial fishing lure 230. Alternatively, at least a portion of the tail end 236 is first removed from the rest of the body 232 by cutting along transverse axis (or other cutting line) 238 forming float-receiving surface 240 (shown in FIG. 2C).

Figure 2C:
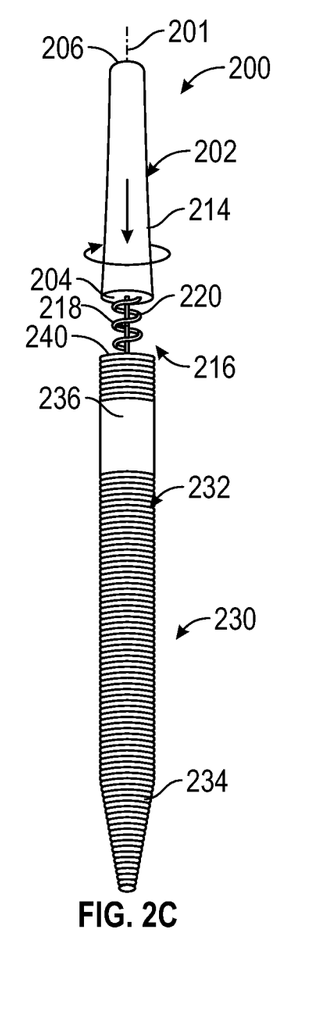

FIG. 2C is an exploded schematic illustrating how to attach the float 200 of FIG. 2A to a remaining portion of the body 232. The "remaining portion of the body 232" is the portion float 200 which has been altered by removing a portion of the as-molded body 202, rendering the remaining portion of the body 232 no longer "as-molded". The float 200 is moved in a proximal direction in relation to the body 232 until the pin 218 is inserted through the float-receiving surface 240. To continue assembly, the float 200 is rotated about the longitudinal axis 201 until the proximal end 204 of the body 202 contacts the float-receiving surface 240 (shown in FIG. 2D), at which point the screw 220 is fully inserted into the body 232 of the artificial fishing lure 230, thus removably retaining the float 200 to the lure 230. The float 200 is detachable from the body 232 by reversing the attachment procedure. In some other examples (not shown), when a different attachment structure is used for the keeper 216 (e.g., a shaft having one or more barbs, one or more wire keepers, or another suitable interference structure), the keeper 216 may be inserted into the body 232 of the artificial fishing lure 230 without rotating.

Figure 2D:
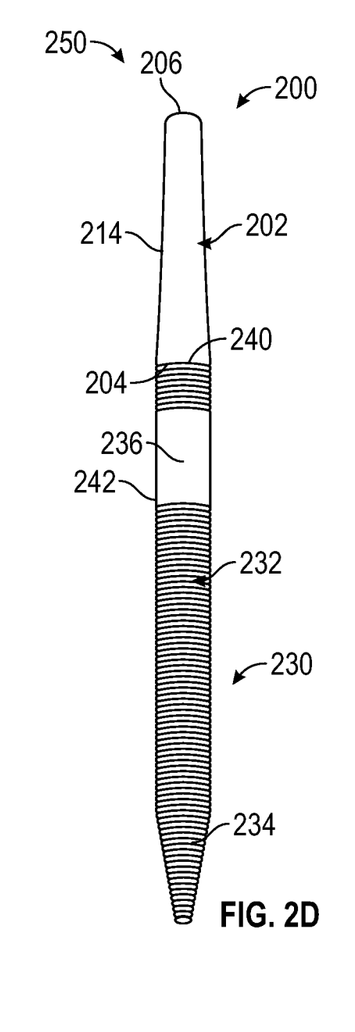
FIG. 2D illustrates the float of FIG. 2A attached to the plastic worm.

FIG. 2D illustrates an assembled bait 250 having float 200 of FIG. 2A attached to the remaining portion of the body 232. The assembled bait 250 has a buoyancy greater than a buoyancy of the as-molded artificial fishing lure 230 prior to removal of at least the portion of the tail end 236 and attachment of the float 200. The outer surface 214 of the float 200 is substantially flush with an outer surface 242 of the body 232 which helps provide the assembled bait 250 with natural presentation and streamlined movement through the water. Beneficially, the float 200 changes the center of buoyancy of the assembled bait 250 as compared to the as-molded artificial fishing lure 230, for example by moving the center of buoyancy closer to an end of the body 202 to which the float 200 is attached, thus making the assembled bait 250 suspend in a more vertical orientation relative to the as-molded artificial fishing lure 230, which under certain conditions, makes the assembled bait 250 more readily seen and attractive to predatory fish. By balancing the amount of material removed from the body 202 and the buoyancy of the float 200, the inclination of the assembled bait 250 in the water column can be readily selected by an angler of just about any condition. An overall size, shape and appearance of the float 200 may be selected to substantially match that of the artificial fishing lure 230 such that the assembled bait 250 is similar in appearance to the as-molded artificial fishing lure 230 (shown as a worm in FIG. 2B). In some examples, one or more of the material, shape, color, texture, profile or finish of the float 200 may match that of the artificial fishing lure 230. In some other examples, the size, shape and/or appearance of float 200 may differ from that of the plastic worm 230 depending on the desired appearance and performance of the assembled bait 250.

Figure 2E:
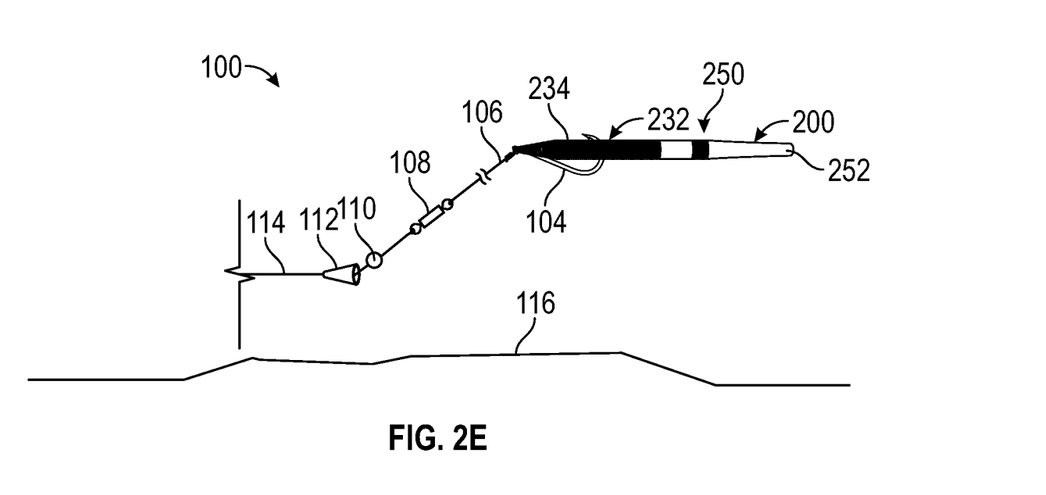
FIG. 2E illustrates an example bait presentation on a Carolina rig with the bait assembly shown in FIG. 2D.

FIG. 2E illustrates an example bait presentation on a Carolina rig 100 with the bait assembly 250 shown in FIG. 2D. In this example, a hook 104 is placed in the head end 234 of the assembled bait 250. Alternatively, the hook 104 can be placed in any suitable position according to the angler's preference. In contrast to FIG. 1A, the float 200 increases the buoyancy of the artificial fishing lure 230 causing the bait assembly 250 to float above bottom 116. Thus, the bait assembly 250 suspends in the water column at a shallower depth than the worm 102 of FIG. 1A. In this example, the bait assembly 250 is oriented horizontally. However, the bait assembly 250 may have a different, non-horizontal, orientation in the water depending on the design of float 200 and the amount of material, if any, removed from the artificial fishing lure 230 prior to attachment of the float 200.

Figure 2F:
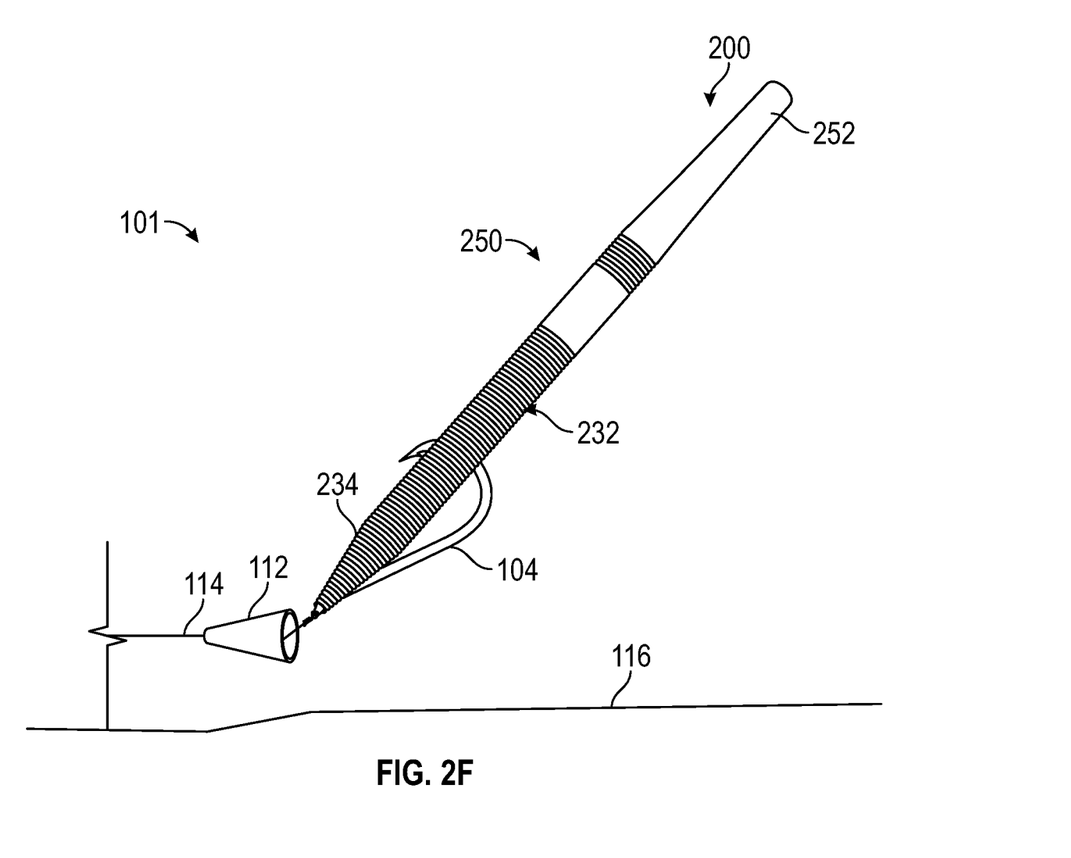
FIG. 2F illustrates an example bait presentation on a Texas rig with the bait assembly shown in FIG. 2D.

FIG. 2F illustrates an example bait presentation on a Texas rig 101 with the bait assembly 250 shown in FIG. 2D. In contrast to FIG. 1B, the float 200 not only increases the buoyancy of the artificial fishing lure 230, but also moves the center of buoyancy of the bait assembly 250 away from the center of the body 202, causing a tail end 252 of the bait assembly 250 (including the float 200) to float above bottom 116 and/or above the head end 234. The bait assembly 250 is oriented more vertically in the water compared to FIG. 2E. In this example, the bait assembly 250 forms an angle with bottom 116 of about 45°. However, the bait assembly 250 may have any non-horizontal orientation in the water. In some examples, the angle may be within a range of about 30° to about 90°. The angle that the bait assembly 250 suspends in the water may be selected depending on the design of float 200 and the amount of material, if any, removed from the artificial fishing lure 230 prior to attachment of the float 200.

As illustrated in FIGS. 2E and 2F, attaching the float 200 to the artificial fishing lure 230 provides more control over bait presentation in the water. For example, the float 200 may alter an orientation and/or depth of the bait. Although the foregoing embodiments have been described using the Carolina rig and Texas rig, the embodiments disclosed can be used with many different fishing rigs.

Figure 3A:
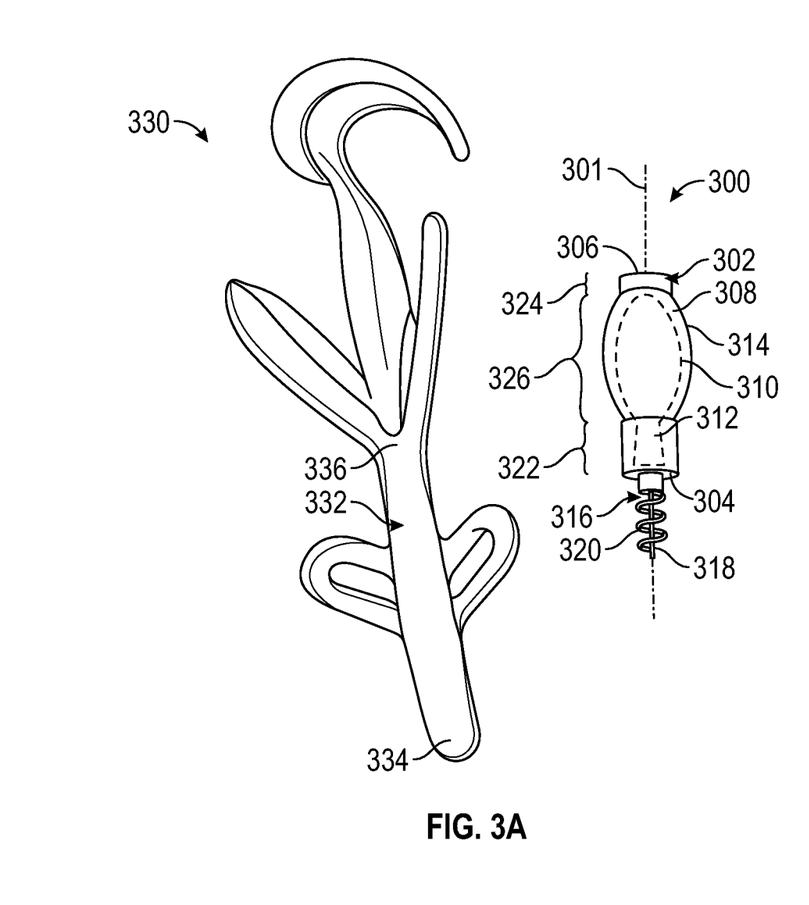
FIG. 3A is a side view of another exemplary attachable float according to one or more embodiments.

FIG. 3A is a side view of another exemplary attachable float 300 shown alongside an exemplary as-molded plastic creature 330, according to one or more embodiments. The plastic creature 330 may be a crawdad, grub, frog, salamander, lizard, paddle tail, minnow, or any other type of plastic lure. The plastic creature 330 generally comprises an elongated body 332 having a creature tail end 334 and a creature head end 336.

Various aspects of the float 300 are the same as described above with respect to the float 200 unless otherwise noted, and corresponding description therefore is incorporated herein by reference to avoid unnecessary repetition. The float 300 generally comprises an elongated body 302 having a first end 304 and a second end 306 connected together by outer wall 308. In this example, the outer wall 308 has a first cylindrical portion 322 at the first end 304, a second cylindrical portion 324 at the second end 306, and a rounded portion 326 connecting the first cylindrical portion 322 and second cylindrical portion 324. The rounded portion 326 appears as an oval shape, or creature head shape, when viewed from the side (shown in FIG. 3A). In this example, the rounded portion 326 is symmetrical about the longitudinal axis 301 of the body 302. In some other examples (not shown), the rounded portion 326 may be non-symmetrical. The outer wall 308 has an inner radial surface 310 (shown in phantom) radially outwardly surrounding and enclosing a hollow cavity 312. An outer radial surface 314 of the outer wall 308 faces opposite the inner radial surface 310. A keeper 316 is disposed at the first end 304 and comprises screw 320. The screw 320, in the form of a corkscrew, may surround a pilot pin 318. The keeper 316 extends longitudinally outwardly from the first end 304 such that the float 300 is attachable to and detachable from an artificial fishing lure as described in more detail below.

Figure 3B:
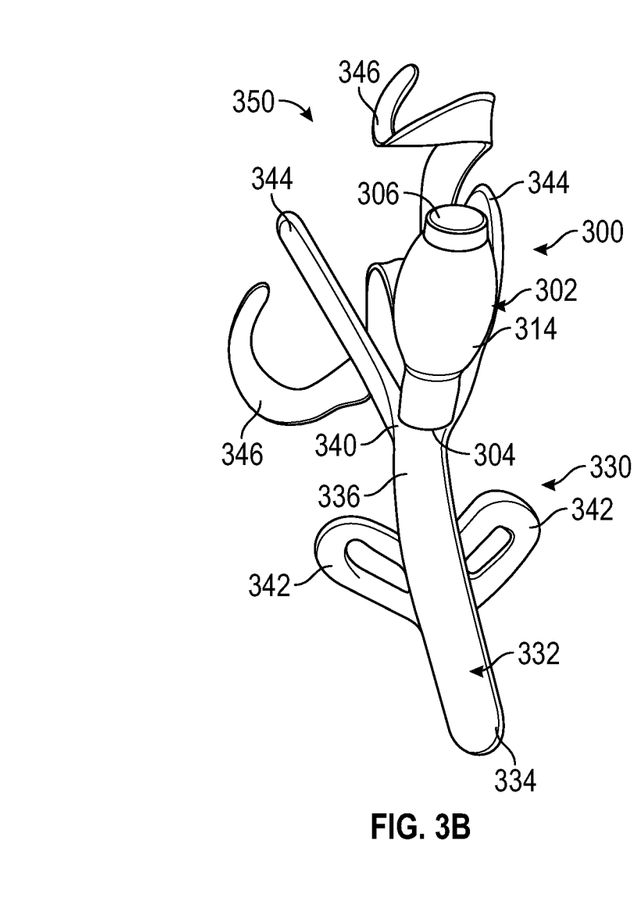
FIG. 3B illustrates the float of FIG. 3A attached to a plastic creature.

FIG. 3B illustrates an assembled bait 350 having the float 300 of FIG. 3A attached to the plastic creature 330. As discussed above, the plastic creature 330 generally comprises an elongated body 332 having a creature tail end 334 and a creature head end 336. In this example, the plastic creature bait 330 has a pair of forward appendages 342, a pair of rearward appendages 344 and a pair of ribbon features 346 extending longitudinally outwardly from the head end 336 (e.g., to mimic antennae, claws, tails, etc.). In this example, in which the plastic creature 330 does not have a defined head, the float 300 is attached directly to a float-receiving surface 340 of the head end 336. When fully assembled, the first end 304 of the float 300 contacts the float-receiving surface 340. In some other examples (not shown), in which the plastic creature has a defined head, the head may be first removed from the rest of the body before attaching the float 300, which is similar to attachment of the float 200 described above with respect to FIGS. 2B and 2C. Although not illustrated in FIG. 3B, a hook can be placed in the assembled bait 350 in any suitable position according to the angler's preference. In one example, the plastic creature 330 may be fished with the head end 336 at a distal end of the fishing rig, i.e., away from the angler, and the hook may be placed in the tail end 334 of the plastic creature 330.

Figure 4A:
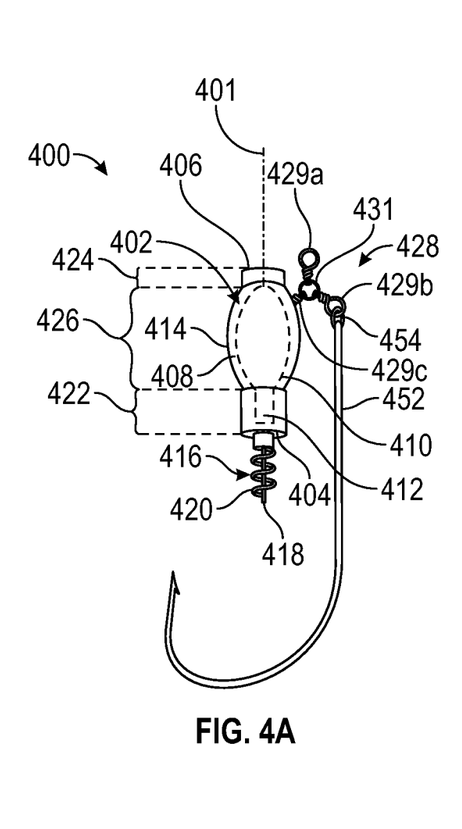
FIG. 4A is a side view of another exemplary attachable float according to one or more embodiments.

FIG. 4A is a side view of another exemplary attachable float 400 according to one or more embodiments. Various aspects of the float 400 are the same as described above with respect to floats 200 and 300 unless otherwise noted, and corresponding description therefore is incorporated herein by reference to avoid unnecessary repetition. The float 400 generally comprises an elongated body 402 having a first end 404 and a second end 406 connected together by outer wall 408. In this example, the outer wall 408 has a first cylindrical portion 422 at the first end 404, a second cylindrical portion 424 at the second end 406, and a rounded portion 426 connecting the first cylindrical portion 422 and second cylindrical portion 424. The rounded portion 426 appears as an oval shape, or lizard head shape, when viewed from the side (shown in FIG. 4A).

In contrast to floats 200 and 300, the float 400 has an integral hook 452. As shown in FIG. 4A, the hook 452 is coupled to the float 400 at a swivel 428. Alternatively, the swivel 428 may be replaced with an eye. The hook 452 is freely movable relative to the body 402. For example, the swivel 428 allows the hook 452 and float 400 to rotate independent from one another. In the example illustrated in FIG. 4A, the swivel 428 is disposed at the second end 406 of the body 402, for example molded into the body 402, and extends radially outwardly from the outer wall 408 of the rounded portion 426. In some other examples (not shown), the swivel 428 may be disposed with and extend radially outwardly from either of the first cylindrical portion 422 or the second cylindrical portion 424. A plane of the swivel 428 is oriented substantially parallel to the longitudinal axis 401 of the body 402. In this example, the swivel 428 comprises a two or three-way swivel. The swivel 428 shown in FIG. 4A is configured as a three-way swivel, having outer rings 429a-429c coupled to a center ring 431. Each outer ring 429a-429c is rotatable relative to the center ring 431 about a respective axis in the plane of the swivel 128. A first outer ring 429a, a second outer ring 429b, and the center ring 431 are disposed outside the body 402, whereas a third outer ring 429c is at least partially disposed inside the body 402. For example, the third outer ring 429c may be molded inside the body 402 so that the swivel 428 is integral with the body 402. In some other examples, the swivel 428 may be coupled to the body 402 using any suitable coupling mechanism. Please note that in both examples, the swivel 428 may be considered to be "coupled" to the body 402. In this example, a fishing line (not shown) may be tied or otherwise coupled to the first outer ring 429a. As shown, an eyelet 454 of the hook 452 is coupled to the second outer ring 429b. The swivel 428 allows the body 402, the hook 452 and the fishing line to swivel (or rotate) relative to each other to help prevent the fishing line from becoming tangled with the body 402, the hook 452, or an artificial fishing lure attached to the float 400. An artificial fishing lure coupled to the float 400 is also afforded more natural movement in the water owing to the freedom of motion provided by the swivel 428. In this example, the hook 452 is a swim bait style hook with approximately a 30° bend in the shank. However, any suitable type of fishing hook may be used with the float 400. In addition to the second outer ring 429b being rotatable about a respective axis in the plane of the swivel 428, the hook 452 is configured to swivel approximately 180° about an axis of the eyelet 454, both of which facilitate coupling of the float 400 to an artificial fishing lure and insertion of the hook 452 into the artificial fishing lure (as shown in FIG. 4B).

The outer wall 408 has an inner radial surface 410 (shown in phantom) radially outwardly surrounding and enclosing a hollow cavity 412. An outer radial surface 414 of the outer wall 408 faces opposite the inner radial surface 410. A keeper 416 is disposed at the first end 404 and comprises a screw 420. The screw 420, when in the form of a corkscrew, is disposed around a pilot pin 418. The keeper 416 extends longitudinally outwardly from the first end 404 such that the float 400 is attachable to and detachable from an artificial fishing lure as described in more detail below.

Figure 4B:
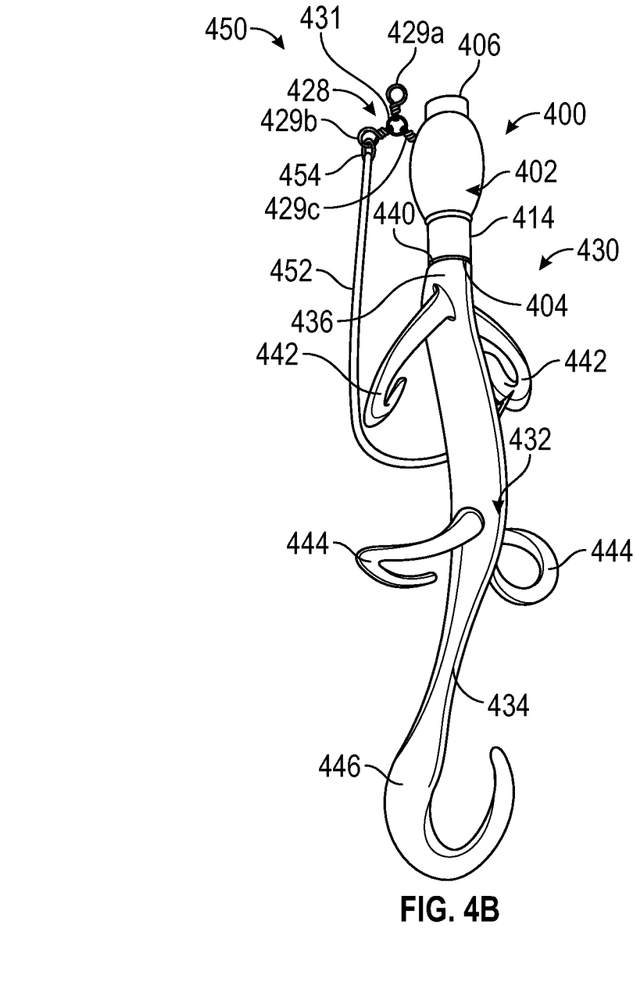
FIG. 4B illustrates the float of FIG. 4A attached to a plastic lizard.

FIG. 4B illustrates an assembled bait 450 having the float 400 of FIG. 4A attached to an exemplary plastic lizard 430. The plastic lizard 430 may be replaced with another plastic creature 330 or other polymeric artificial lure. The plastic lizard 430 generally comprises an elongated body 432 having a lizard tail end 434 and a lizard head end 436. In this example, the plastic lizard bait 430 has a pair of forward appendages 442, a pair of rearward appendages 444 and a ribbon tail 446. In order to attach the float 400 to the plastic lizard 430, a head of the lizard (not shown) is first removed from the rest of the body before attaching the float 400, which is similar to attachment of the float 200 described above with respect to FIGS. 2B and 2C. Removal of the head from the head end 436 forms float-receiving surface 440. When fully assembled, the first end 404 of the float 400 contacts the float-receiving surface 440. After the float 400 is attached to the plastic lizard 430, the hook 452 is inserted through the body 432 to complete the assembly.

While the foregoing is directed to embodiments of the present disclosure, other and further embodiments of the disclosure may be devised without departing from the basic scope thereof, and the scope thereof is determined by the claims that follow.

What is claimed is:

1. A hookless float attachable to an artificial lure, comprising:
 a hookless elongated buoyant body having a positive buoyancy and comprising:
  a first end;
  a second end;
  an outer wall connecting the first and second ends; and
  a centerline extending between the first and second ends in a direction in which the hookless elongated buoyant body is elongated;
 a corkscrew extending outward from the first end of the hookless elongated buoyant body, the corkscrew configured to screw into a polymeric artificial lure to attach the hookless elongated buoyant body to the polymeric artificial lure in such that the first end of the hookless elongated buoyant body abuts the artificial lure, wherein the hookless float is configured to completely suspend the artificial lure within a water column without being acted upon by external forces.

2. The hookless float of claim 1, wherein the outer wall of the hookless elongated buoyant body encloses a hollow cavity.

3. The hookless float of claim 1, wherein the hookless elongated buoyant body comprises a hardened plastic material.

4. The hookless float of claim 1, wherein the corkscrew is co-axial with the centerline of the hookless elongated buoyant body that extends between the first and second ends.

5. The hookless float of claim 1, wherein the hookless elongated buoyant body further comprises:
 a first cylindrical portion at the first end;
 a second cylindrical portion at the second end; and a rounded portion connecting the first cylindrical portion and the second cylindrical portion.

6. The hookless float of claim 1, wherein the hookless elongated buoyant body further comprises an oval shape.

7. The hookless float of claim 1 further comprising:
a pilot pin extending out from the hookless elongated buoyant body axially through the corkscrew.

8. A float configured to be coupled to an artificial lure, the float consisting essentially of:
a hookless elongated buoyant body having a positive buoyancy, the hookless elongated buoyant body elongated between first and second ends defining a major axis; and
a keeper extending on the major axis from the hookless elongated buoyant body, the keeper configured to attach the hookless elongated buoyant body directly to a polymeric artificial lure, wherein the float is configured to completely suspend the artificial lure within a water column without being acted upon by external forces.

9. The float of claim 8, wherein the hookless elongated buoyant body is formed from a hardened plastic material.

10. The float of claim 8, wherein the keeper is a corkscrew.

11. The float of claim 8, wherein the keeper is a corkscrew having a pilot pin extending longitudinally outwardly from the hookless elongated buoyant body axially through the corkscrew.

12. A bait assembly, comprising:
an artificial lure; and
a hookless elongated buoyant body having a positive buoyancy and comprising:
a first end;
a second end;
an outer wall connecting the first and second ends; and
a centerline extending between the first and second ends in a direction in which the hookless elongated buoyant body is elongated;
a corkscrew extending outward from the first end of the hookless elongated buoyant body, the corkscrew screwed into the artificial lure and attaching the hookless elongated buoyant body to the artificial lure in such that the first end of the hookless elongated buoyant body abuts the artificial lure, wherein the hookless float is configured to completely suspend the artificial lure within a water column without being acted upon by external forces.

13. The bait assembly of claim 12 further comprising:
a pilot pin extending longitudinally outwardly from the hookless buoyant body axially through the corkscrew.

14. The bait assembly of claim 12, wherein the hookless buoyant body further comprises an oval shape.

* * * * *